(12) United States Patent
Baud et al.

(10) Patent No.: US 10,486,241 B2
(45) Date of Patent: Nov. 26, 2019

(54) DRILLING DEVICE AND DRILLING METHOD USING SUCH A DRILLING DEVICE

(71) Applicant: LE CRENEAU INDUSTRIEL, Annecy-le-Vieux (FR)

(72) Inventors: Sebastien Baud, La Cote D'Arboz (FR); Bruno Botton, Hauteville sur Fier (FR)

(73) Assignee: LE CRENEAU INDUSTRIEL, Annecy-le-Vieux (FR)

( * ) Notice: Subject to any disclaimer, the term of this patent is extended or adjusted under 35 U.S.C. 154(b) by 0 days.

(21) Appl. No.: 15/880,246

(22) Filed: Jan. 25, 2018

(65) Prior Publication Data
US 2018/0207731 A1    Jul. 26, 2018

(30) Foreign Application Priority Data
Jan. 25, 2017   (FR) .................................... 17 50605

(51) Int. Cl.
*B23B 39/16*   (2006.01)
*B23B 39/24*   (2006.01)
*B23B 35/00*   (2006.01)

(52) U.S. Cl.
CPC ............ *B23B 39/161* (2013.01); *B23B 35/00* (2013.01); *B23B 39/24* (2013.01); *B23B 2215/04* (2013.01); *B23B 2265/08* (2013.01); *Y10T 408/38* (2015.01); *Y10T 408/385* (2015.01); *Y10T 408/675* (2015.01)

(58) Field of Classification Search
CPC ....... B23B 39/161; B23B 35/00; B23B 39/24; Y10T 408/38; Y10T 408/385; Y10T 408/675
See application file for complete search history.

(56) References Cited

U.S. PATENT DOCUMENTS

| | | | | |
|---|---|---|---|---|
| 3,635,570 | A | * | 1/1972 | DeGelleke ............ B23B 39/167 408/113 |
| 3,822,958 | A | * | 7/1974 | Lewis ................... B23B 39/161 408/129 |
| 6,099,212 | A | * | 8/2000 | Marocco ............... B23B 39/161 144/3.1 |

(Continued)

FOREIGN PATENT DOCUMENTS

| | | | | |
|---|---|---|---|---|
| DE | 4409912 A1 | * | 9/1995 | ........... B23B 39/161 |
| EP | 2783777 A1 | * | 10/2014 | ............ B23B 35/00 |
| GB | 1373526 A | * | 11/1974 | .......... B23B 39/165 |

*Primary Examiner* — Eric A. Gates
(74) *Attorney, Agent, or Firm* — Oblon, McClelland, Maier & Neustadt, L.L.P.

(57) ABSTRACT

There is provided a drilling device for drilling a sheet having conical portions, including a tool-holder plate provided with a plurality of rotary drilling spindles with drill bits oriented according to drilling directions parallel to a mean drilling direction, said drilling spindles being distributed in columns configured to be arranged according to an axial direction and in rows configured to be arranged according to a transverse direction at right angles to the axial direction, the device including at least two rows of spindles and at least two columns of spindles, wherein a center-to-center distance between two spindles of a row is different from a center-to-center distance between two spindles of another row.

12 Claims, 11 Drawing Sheets

(56) References Cited

U.S. PATENT DOCUMENTS

| | | | |
|---|---|---|---|
| 7,954,216 B2 * | 6/2011 | Sturm | B23B 39/16 144/35.1 |
| 2003/0180106 A1 * | 9/2003 | Russell | B23B 39/162 408/1 R |
| 2013/0209185 A1 * | 8/2013 | Sasaki | B23B 39/24 408/1 R |

* cited by examiner

DRILLING DEVICE AND DRILLING METHOD USING SUCH A DRILLING DEVICE

The present invention relates to a drilling device and drilling method using such a drilling device, in particular for parts of generally conical, tapered or more generally complex form, used in the construction of airplane jet engine nacelles to reduce the sound nuisances thereof.

These days, a transport airplane is generally propelled by a set of turbojet engines, each housed in a nacelle of generally tubular form, or more specifically having sections of conical or tapered form.

Such a turbojet engine comprises a fan, generally upstream, delivering an annular air stream with a, primary, central annular part which feeds the motor driving the fan and a, secondary, outer annular part which is ejected into the atmosphere while imparting a significant fraction of the thrust.

In its construction, to fix the rotor of the engine and guide the stream, the turbojet engine comprises a row of fixed blades.

It is on this row that noise is generated by the impact of the speed and pressure fluctuations on the blades which are caused by an unsteady flow.

To reduce the noise from these turbojet engines, use is made of emitted noise reduction devices, through the creation of Helmholtz resonators.

In practice, this is reflected in the fact that the nacelles comprise acoustic sheets having, for example, one or more layers of structures with cellular core, of honeycomb type. These acoustic sheets are generally produced in carbon, aluminum, titanium, Inconel composite. The layers of structures with cellular core are generally coated on their inner and outer faces with skins in the form of acoustic sheets having a multitude of small diameter holes, distributed in such a way as to obtain an effect of acoustic absorption of the noises generated by the engines. These holes are generally produced by drilling, in order to guarantee the accuracy, particularly in terms of positioning, necessary to the effective acoustic absorption.

Indeed, in order to create Helmholtz resonators with an effective impact on the acoustic absorption, the distribution of the holes in the acoustic plates is very important and significantly influences the level of noise generated by the turbojet engine.

However, in the case of the production of such a sheet, the latter can be drilled only after having been shaped previously. The result thereof is that the sheet generally has a surface of conical, tapered, concave, convex or complex (with concave zones and convex zones) form.

Now, to achieve an optimal acoustic absorption, it is necessary for the accurate positioning of the holes produced to be observed within fairly restricted limits, even on complex forms.

To do this, the document EP 2 783 777 in the name of the Applicant and incorporated by reference discloses a drilling device for drilling a sheet, comprising a tool-holder plate provided with a plurality of rotary drilling spindles with drill bits oriented according to drilling directions parallel to a mean drilling direction. The drilling spindles are distributed with constant center-to-center distance on the tool-holder plate in a first and a second transverse direction to form a matrix arrangement of drilling spindles.

According to a finer analysis of the drilling process, the presence of defects has been noted in the positioning of inter-patch holes (holes between two adjacent patches) and intra-patch holes (within one and the same patch) in the drilling patterns if a tool-holder plate having a matrix distribution of the spindles is used on portions of conical form.

Now, with the acoustic standards in the air transport sector which are becoming increasingly stringent with regard to the acoustic performance levels of the turbojet engines, it has been noted that an increase in the accuracy of positioning of the holes would allow an even more significant noise reduction.

Figure 1A:
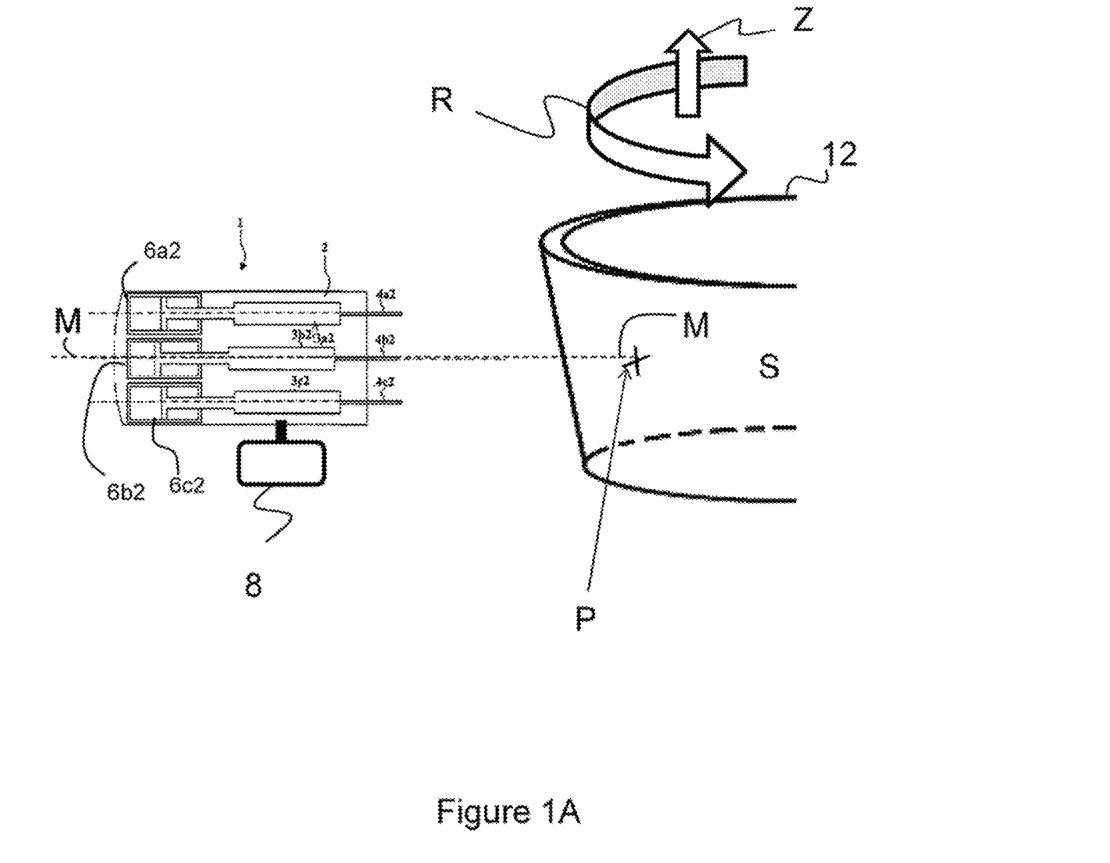
FIG. 1A is a perspective view of a drilling device facing a sheet to be drilled.

FIG. 1A is a perspective view of a drilling device 1 equipped on the one hand with a tool-holder plate 2 facing a sheet (or plate or panel) 12 to be drilled and, on the other hand, linear displacement means 8 for displacing the tool-holder plate 2 in the mean direction of drilling M-M.

Sheet 12 may be as described above an acoustic sheet having, for example, one or more layers of structures with cellular core, of honeycomb type. It may be manufactured in carbon, aluminum, titanium, Inconel composite.

The tool-holder plate 2 is for example provided with nine spindles (only the spindles 3$a$2, 3$b$2 and 3$c$2 are visible in FIG. 1A) arranged in matrix formation and bearing drill bits (only the drill bits 4$a$2, 4$b$2 and 4$c$2 are visible in FIG. 1A).

In this figure, S denotes the surface of the sheet 12 which has to be drilled.

The sheet 12 is opened out into a truncated cone form in which the radius of the small base is located at the bottom of FIG. 1A and the radius of the large base is located at the top of FIG. 1A.

To drill holes, the tool-holder plate 2 is brought into working position facing the surface S of the sheet 12, with the mean drilling direction M-M substantially at right angles to the surface S at a point P of the sheet 12.

For greater simplicity, bearings are taken in the drilling according to an axial direction Z (from bottom to top in FIG. 1A), also called station axis which denotes the direction intended to be parallel to the axis of rotation of the engine of the turbojet engine when the sheet 12 is mounted on a nacelle with the turbojet engine.

The transverse direction R (also called radial direction) on the surface S is at right angles to the axial direction. Since an engine nacelle is of generally cylindrical/tapered form, the transverse direction is therefore at right angles to the axis of the engine of the turbojet engine and at right angles to the axial direction Z.

To drill holes in the sheet 12, bearings can therefore be taken according to the axis Z on the one hand and the transverse radial position R on the other hand.

Figure 1B:
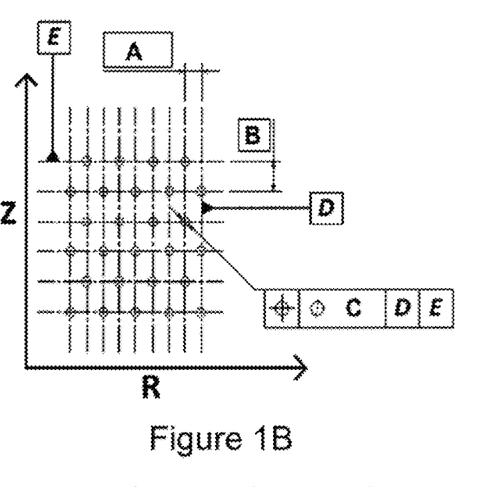
FIG. 1B shows an example of an elementary rectangular pattern for drilling holes in an acoustic sheet, FIG. 2, according to a front view, an example of a drilling device according to the prior art comprising a matrix distribution of drilling spindles, FIG. 3 schematically shows a hole drilling pattern produced by a single spindle.

FIG. 1B shows an example of an elementary rectangular hole-drilling pattern in an acoustic sheet 112.

The drilling pattern can also be square or diamond-shaped.

The distance A denotes the center-to-center distance between two columns of holes and the distance B denotes the center-to-center distance between two rows and C being the diameter of the location tolerance of the holes of a given diameter, the dimensions E and D are geometrical references (planes).

As can be seen in FIG. 1B, the holes of two columns or of two rows are respectively offset relative to one another.

Figure 2:
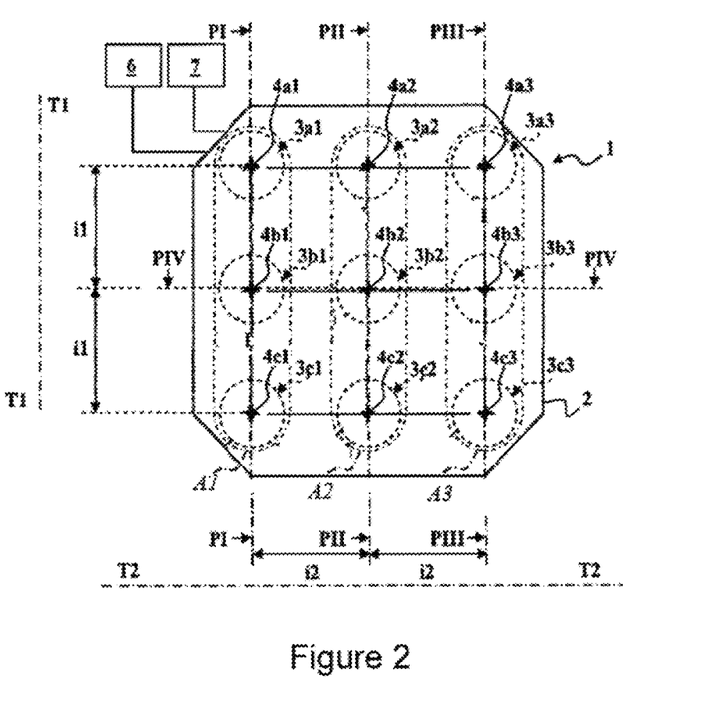

It is assumed that, to drill the holes, a drilling device 1 that is equipped with a tool-holder plate 2 provided with a 3×3 matrix of drilling spindles as shown in FIG. 2 is used.

The tool-holder plate 2 has three linear arrangements of drilling spindles 3 A1, A2 and A3, distanced from one another with constant center-to-center distance i2 on the tool-holder plate 2 according to a second transverse direction T2-T2.

The linear arrangements of drilling spindles A1, A2 and A3 are respectively contained in parallel planes PI, PII and PIII. These planes PI, PII and PIII are parallel to the axial direction Z in the performance of the drilling operations.

The linear arrangement of drilling spindles A1 comprises three drilling spindles 3a1, 3b1, and 3c1 distributed with constant center-to-center distance i1 on the tool-holder plate 2 according to the first transverse direction T1-T1, and respectively bearing drill bits 4a1, 4b1, and 4c1.

The linear arrangement of drilling spindles A2 comprises three drilling spindles 3a2, 3b2, and 3c2, distributed with constant center-to-center distance i1 on the tool-holder plate 2 according to the first transverse direction T1-T1, and respectively bearing drill bits 4a2, 4b2, and 4c2.

Finally, the linear arrangement of drilling spindles A3 comprises three drilling spindles 3a3, 3b3, and 3c3, distributed with constant center-to-center distance i1 on the tool-holder plate 2 according to the first transverse direction T1-T1, and respectively bearing drill bits 4a3, 4b3, and 4c3.

The drill bits 4a1 to 4c3 are oriented according to the mean drilling direction M-M (see FIG. 1A).

According to another interpretation, the drilling device 1 comprises three linear arrangements each comprising three drilling spindles 3a1-3a3, 3b1-3b3, and 3c1-3c3, distanced from one another by constant center-to-center distance i2 on the tool-holder plate 2 according to the second transverse direction T2-T2.

According to this exemplary embodiment, the drill bit 4b2 is located in the center of the pattern and coincides with the mean drilling direction M-M.

The drilling device 1 can also comprise controlled individual displacement means (for example 6a2, 6b2 and 6c2 in FIG. 1A), controlled by control means 6 to axially displace, in relation to the tool-holder plate 2, each of the rotary drilling spindles 3a1 to 3c3 according to their respective drilling directions.

The drilling device 1 also comprises means 7 for monitoring the intensity of the electrical current consumed by each of the drilling spindles 3a1 to 3c3.

To produce a drilling pattern, the center-to-center distances i1 and i2 are multiples of the center-to-center distances A and B (see FIG. 1B).

Figure 3:
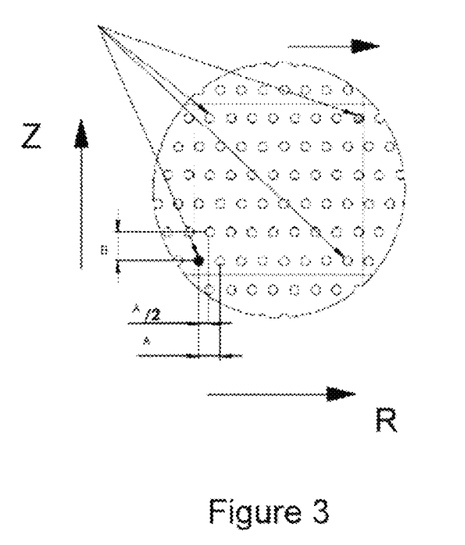

The drill bit 4b2 which coincides with the mean drilling direction M-M is for example configured to drill holes according to a drilling pattern as represented in FIG. 3, that is to say eight holes in the transverse direction R and six holes in the axial direction Z. According to one possible drilling plan, the plan begins for example with the pattern bottom left (seen in FIG. 3) to finish top right (seen in FIG. 3) by drilling the various holes embodied by circles.

Figure 4:
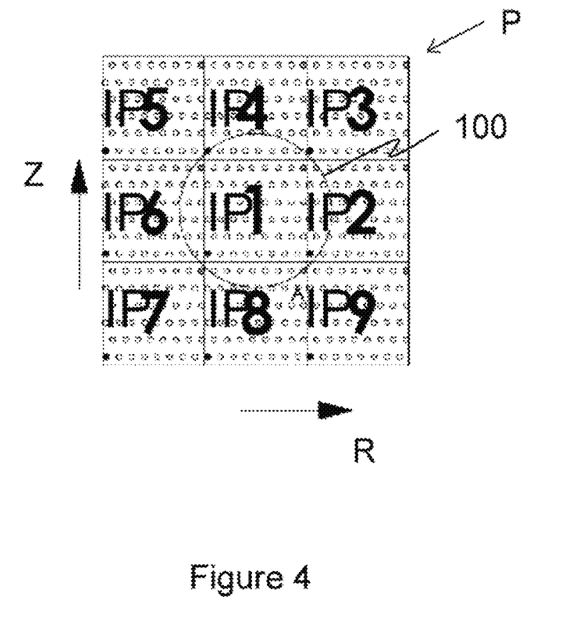
FIG. 4 shows an example of a hole drilling pattern produced by a tool-holder plate comprising 3×3 spindles according to a matrix arrangement on a planar acoustic sheet.

The other spindles 3 of the tool-holder plate 2 will therefore repeat, by transposition, the same pattern as represented in FIG. 4, the circle 100 of FIG. 4 corresponding to the circle represented in FIG. 3.

Thus, the spindle 4b2 will drill the patterns in the square denoted IP1, the spindle 4b3 the patterns in the square denoted IP2, the spindle 4a3 the patterns in the square IP3, the spindle 4a2 in the square IP4, the spindle 4a1 in the square IP5, the spindle 4b1 in the square IP6, the spindle 4c1 in the square IP7, the spindle 4c2 in the square IP8 and the spindle 4c3 in the square IP9.

The set of squares IP1 to IP9 forms a patch P and, by repetition of the patches, that is to say by repeating patches in bands according to the transverse direction R, holes forming Helmholtz resonators to trap the noise will be able to be formed over all of a sheet 12 to be prepared.

As described above, for a sheet of, for example, conical form, defects of regularity of the holes drilled between the adjacent squares of the set of squares IP1 to IP9 have been observed, called an intra-patch defect, as well as between two adjacent patches (each patch being formed for example by nine squares IP1 to IP9), called an inter-patch defect.

Figure 5:
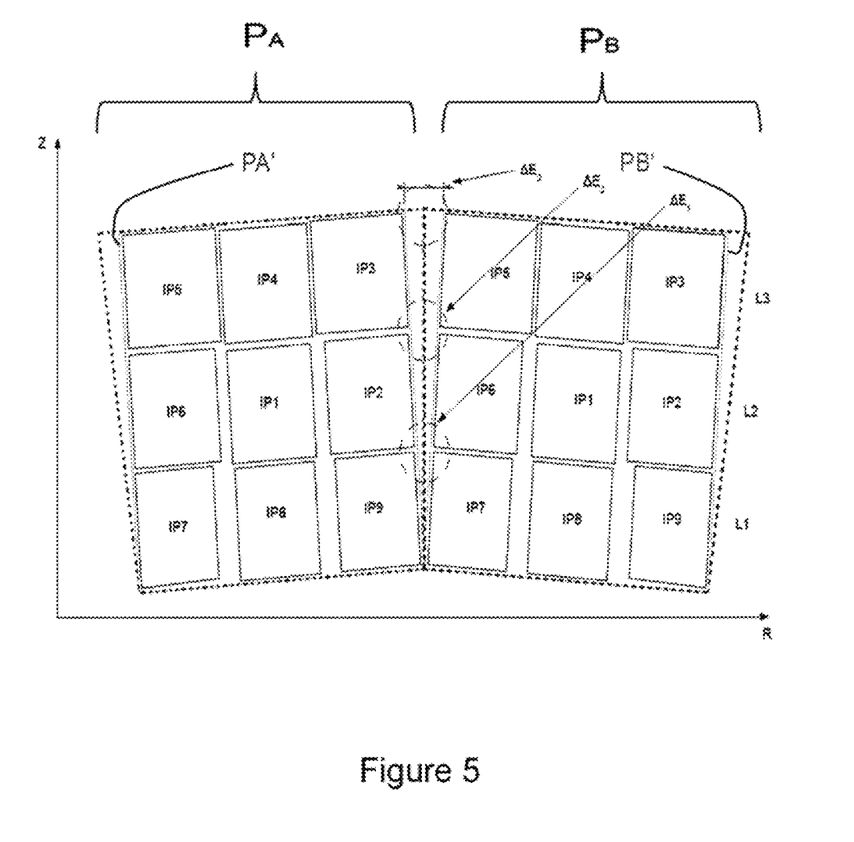
FIG. 5 shows an example of a hole drilling pattern produced by a tool-holder plate comprising 3×3 spindles according to a matrix arrangement on a conical acoustic sheet.

FIG. 5 shows the squares IP1 to IP9 of two adjacent patches.

The outlines of the patches Pa and Pb delimit the zones to be drilled ideally, and the outlines of the patches Pa' and Pb' delimit the zones drilled by a tool-holder plate 2 having a strictly matrix distribution of the spindles 3.

Since A is the desired or nominal center-to-center distance between the holes, the distance between holes should, ideally, be the same over all the sheet 12. That would result, as shown in FIG. 4 for a planar sheet, in all the squares IP1 to IP9 touching to form a single square or rectangle. Likewise for the patches which would touch by their sides.

Because of the conical/convex nature of the sheet 12, by applying the drilling pattern for the spindle 4b2, the squares IP2 to IP9 are ultimately a little offset and the distribution of the holes is not as regular as in FIG. 4 for a planar sheet.

It is thus possible to define, for each line of squares, the line $L_1$ comprising the squares 1P7 to IP9, the line $L_2$ comprising the squares IP1, IP2 and IP6 and the line $L_3$ comprising the squares IP3 to IP5, an inter-patch defect ΔEi (i=1, 2 or 3 and corresponding to the index of the line of squares).

If the tool-holder plate 2 comprises more than three rows, the number of inter-patch defects to be taken into account would correspond to the number of rows of the drill bits 4 or of spindles 3.

Defects of positioning of holes are also observed within the patches $P_A$ and $P_B$ because, as can be seen, the squares IP1 to IP9 are not contiguous with their sides.

Finally, misalignments are also observed between the squares IP1 to IP9 in the axial direction.

All these defects of positioning of the holes drilled contribute to preventing the sheet from being able to develop all its potential acoustic absorption faculties.

The invention aims to at least partially mitigate the above drawbacks, by proposing in particular a drilling device with a tool-holder plate with multiple spindles making it possible to reduce the defects described above for sheets that are developed at least by conical or tapered portions.

To this end, the subject of the invention is a drilling device for drilling a sheet having conical portions, comprising a tool-holder plate provided with a plurality of rotary drilling spindles with drill bits oriented according to drilling directions parallel to a mean drilling direction, said drilling spindles being distributed, on the one hand, in columns intended to be arranged according to an axial direction and, on the other hand, in rows intended to be arranged according to a transverse direction at right angles to the axial direction, the device comprising at least two rows of spindles and at least two columns of spindles, characterized in that the center-to-center distance between two spindles of a row is different from the center-to-center distance between two spindles of another row.

According to one aspect, the tool-holder plate has a first and a last rows of spindles, the first row of spindles being intended to be arranged on the side of the tapered part having the smallest radius of the sheet to be drilled and the last row of spindles being intended to be arranged on the side of the tapered part having the greatest radius of the sheet to be drilled, the center-to-center distance between two spindles increasing from one row to another between the first and the last rows of spindles.

According to another aspect, whereby G is the nominal center-to-center distance between two spindles of a same row in a matrix configuration of the tool-holder plate and $\Delta E_i$ is a maximum inter-patch deviation determined for the row $L_i$ which would result from drillings over a conical portion by a matrix configuration of the tool-holder plate, i being an integer number i=1 to n, where n is the number of rows of spindles of the tool-holder plate, characterized in that the distance between two spindles of a same row i is given by the relationship:

$$D = G + F_i = G + \frac{k_1}{(m-1)} * \Delta E_i$$

in which m corresponds to the number of columns of spindles of the tool-holder plate and $k_i$ is a constant.

The constant is for example $k_i$=0.71.

The number of rows of spindles can be greater than the number of columns of spindles.

According to another aspect, the number m of columns of spindles is greater than or equal to three and in a same row of spindles, the intermediate spindles arranged between the end spindles are offset according to the axial direction in relation to the end spindles.

The spindles of a same row are for example arranged according to a circular arc.

The circular arc is for example defined by the two end spindles and a vertex point situated equidistant from the end spindles, the vertex point being offset by a value $\varepsilon_i$ from the end spindles in the axial direction, the value $\varepsilon_i$ is given by the relationship:

$\varepsilon_i = k_2 * (\Delta E_i - \Delta E_{i-1})$, in which $k_2$ is a constant and $\Delta E_0$=0, the constant $k_2$ being, for example, $k_2$=0.17.

The invention relates also to a method for drilling a sheet having a conical portion using a drilling device as defined above, in which
  the form of the conical portion to be drilled is supplied to computation means,
  the conical portion to be drilled is divided up into bands according to the transverse direction,
  then, for at least one band:
  the tool-holder plate is positioned to drill holes by contiguous zones along the transverse direction by orienting the tool-holder plate in such a way that the row of spindles having the smallest center-to-center distance between spindles is arranged on the side of the sheet to be drilled having the smallest radius.

According to another aspect, when drilling holes according to a pattern in a zone, the tool-holder plate is directed between two hole drilling operations according to regular pitches in the axial direction and/or the transverse direction corresponding to the center-to-center distance between holes according to the axial direction and/or the transverse direction.

According to yet another aspect, when drilling holes according to a pattern in a zone, the tool-holder plate is directed between two hole drilling operations according to regular pitches whose spacing in the axial direction lies within the nominal center-to-center distance tolerances between holes and different from the nominal center-to-center distance between holes in the axial direction so as to adapt the extension in the axial direction of the zone to be drilled to correct geometrical defects between bands to be drilled.

The present invention relates also to a drilling device for drilling a sheet having conical portions, comprising a tool-holder plate provided with a plurality of rotary drilling spindles with drill bits oriented according to drilling directions parallel to a mean drilling direction, said drilling spindles being distributed, on the one hand, in columns intended to be arranged according to an axial direction and, on the other hand, in rows intended to be arranged according to a transverse direction at right angles to the axial direction, the device comprising at least two rows of spindles and at least two columns of spindles, the center-to-center distance between two spindles of a row being different from the center-to-center distance between two spindles of another row and G being the nominal center-to-center distance between two spindles of a same row in a matrix configuration of the tool-holder plate and $\Delta E_i$ being a maximum inter-patch deviation determined for the row $L_i$ which would result from drillings over a conical portion by a matrix configuration of the tool-holder plate, i being an integer number i=1 to n, where n is the number of rows of spindles of the tool-holder plate, the distance between two spindles of a same row i being given by the relationship:

$$D = G + F_i = G + \frac{k_1}{(m-1)} * \Delta E_i$$

in which m corresponds to the number of columns of spindles of the tool-holder plate and $k_i$ is a constant.

Other advantages and features will emerge on reading the description of the following figures, given by way of non-limiting example.

In all the figures, the same references apply to the same elements.

For certain specific production aspects, reference can be made to the published patent EP 2 783 777 in the name of the Applicant.

In some figures, a reference is indicated in order to better understand the orientation of the elements in relation to one another.

In the present explanation, the axial direction Z (from bottom to top in the figures), also called station axis which denotes the direction intended to be parallel to the axis of rotation of the engine of the turbojet engine when the sheet to be drilled is mounted on a nacelle with the turbojet engine.

The transverse direction R (also called radial direction) is at right angles (or perpendicular) to the axial direction Z. Since an engine nacelle is of generally cylindrical/tapered form, the transverse direction is therefore at right angles to the axis of the engine of the turbojet engine and at right angles to the axial direction Z.

The embodiments described are examples. Although the description refers to one or more embodiments, this does not necessarily mean that each reference relates to the same embodiment, or that the features apply only to a single embodiment. Single features of different embodiments can also be combined to provide other embodiments.

Moreover, in the present explanation, the elements have to be indexed. For example, an element may bear a reference number followed by two indices. It therefore relates to identical elements positioned for example at different points. Thus, a spindle may be referenced by the numeral 3 and the spindle 3a1 means a spindle 3 of row a and column 1.

Figure 6:
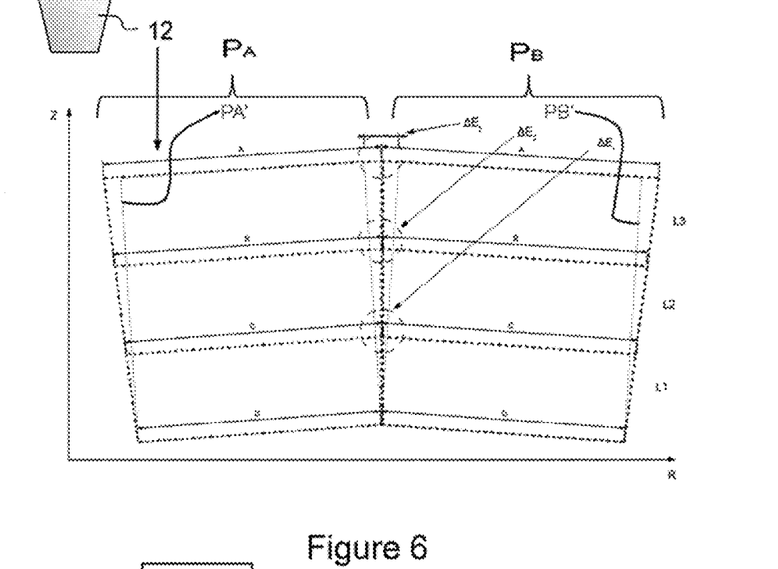
FIG. 6 shows a diagram making it possible to determine inter-patch defects.

Referring to FIG. 6 and, naturally, assuming that the planes of the sheet 12 to be drilled are supplied in numerical form to make it possible to design the tool-holder plate 2 in CAD (computed-assisted design) for the drilling device 1.

It is assumed in the context of the present explanation that the sheet 12 as shown in FIG. 1A has a tapered form whose small radius is located at the bottom (seen on the figures page) and the large radius is located at the top (a small diagram of the sheet 12 appears at the top of FIG. 6).

For a more complex sheet 12, consideration is given to designing different tool-holder plates 2 for different zones of the sheet 12 to be able to address, in each zone, the drilling accuracy requirements while having, to the greatest possible extent, the greatest number of spindles 3 in order to drill the greatest possible number of holes in one go.

FIG. 6 shows a diagram making it possible to determine inter-patch defects which would result from the use of a tool-holder plate 2 provided with spindles 3 in matrix as explained in relation to FIGS. 1A to 5. The outlines of the patches Pa and Pb delimit the zones to be drilled ideally, and the outlines of the patches Pa' and Pb' delimit the zones drilled by a tool-holder plate 2 having a strictly matrix distribution of the spindles 3.

In FIG. 6, the outline of a patch PA has been shown by a square drawn with an alternating line and single dots and the outline of a patch PB has been embodied by a square drawn with an alternating line and double dots.

It is thus possible to determine, for each line $L_1$ to $L_3$ an inter-patch defect $\Delta E_i$ (i=1, 2 or 3 and corresponding to the index of the line of squares), A being the nominal center-to-center distance between holes.

To reduce the inter-patch defects, as well as the intra-patch defects, the idea of the invention consists in spreading, for each line $L_i$, the defect according to the transverse direction R while remaining within the center-to-center distance tolerances between holes given by the manufacturer of the nacelle that has to be equipped with a drilled sheet 12.

Figure 7:
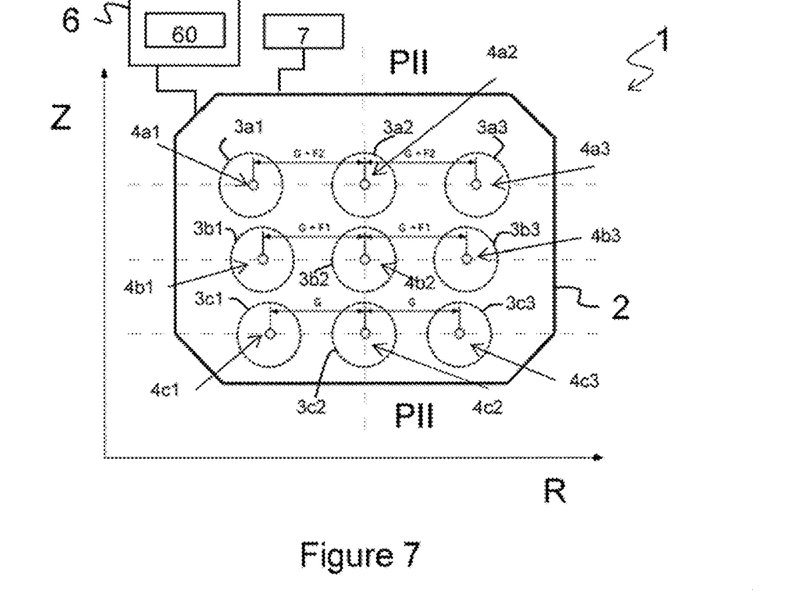
FIG. 7 shows an example according to a schematic front view of a tool-holder plate according to a first embodiment.
Figure 8:
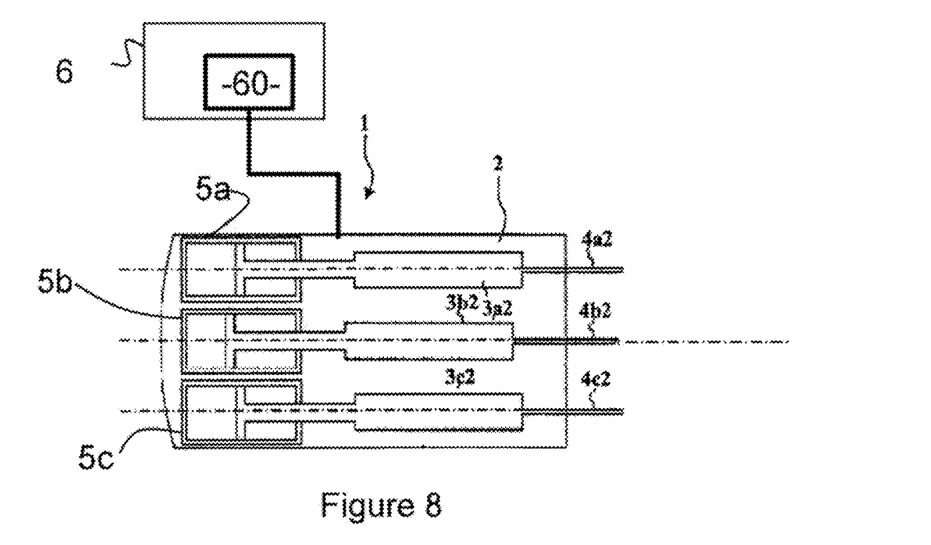
FIG. 8 shows a schematic view in cross section of FIG. 7 according to a central cutting plane PII.

Thus, FIG. 7 shows an example according to a schematic front view of a tool-holder plate 2 according to a first embodiment and FIG. 8 shows a schematic view in cross section of FIG. 7 according to a central cutting plane PII.

This example is very similar to the tool-holder plate of FIGS. 1A and 2 and differs therefrom by the precise positioning of the spindles 3a1 to 3c3, which is no longer a matrix. Indeed, the center-to-center distance between two spindles 3 of a row a, b or c in the transverse direction is different from the center-to-center distance between two spindles 3 of another row, for example b, c, or a, in the transverse direction R.

To show these differences, FIG. 7 is simplified compared to FIG. 2 and shows a little less detail to focus on these differences of positioning of the spindles 3 of a row in relation to another row.

Thus, the drilling device 1 for drilling a sheet 12 having conical portions comprises a tool-holder plate 2 provided with a plurality of rotary drilling spindles 3a1 to 3c3 with drill bits 4a1 to 4a3 oriented according to drilling directions parallel to a mean drilling direction M-M.

The drilling spindles 3 being distributed on the one hand in columns indexed in the present exemplary embodiment from 1 to 3 and intended to be arranged according to an axial direction Z and on the other hand in rows indexed a, b and c intended to be arranged according to a transverse direction R, at right angles to the axial direction.

The number of rows is at least two, but can for example reach five or seven rows of spindles 3.

The number of columns is at least two, but can for example reach three or five rows of spindles 3.

The tool-holder plate 2 has a first and a last rows of spindles 3. The first row of spindles 3 is intended to be arranged on the side of the tapered part having the smallest radius of the sheet 12 to be drilled and the last row of spindles 3 is intended to be arranged on the side of the tapered part having the greatest diameter of the sheet 12 to be drilled. The center-to-center distance between two spindles increases from one to the adjacent next row between the first and last rows of spindles 3. According to the embodiment of FIG. 7, the first row of spindles 3 corresponds to the row bearing the spindles 3c1 to 3c3 and the last row of spindles 3 corresponds to the row bearing the spindles 3a1 to 3a3.

If G is the nominal center-to-center distance between two spindles 3 of a same row in a matrix configuration of the tool-holder plate 2 (which would be adapted for a planar sheet and in which G is a multiple of the center-to-center distance between the center-to-center distance between holes) and $\Delta E_i$ is a maximum inter-patch deviation determined for the row i and resulting from drillings over a conical portion by a matrix configuration, i being an integer number i=1 to n, where n is the number of rows of spindles of the tool-holder plate, the center-to-center distance between two spindles 3 for a tool-holder plate 2 according to the invention as shown in FIG. 7 is given by the relationship:

$$D = G + F_i = G + \frac{k_1}{(m-1)} * \Delta E_i$$

in which m corresponds to the number of columns of spindles 3 of the tool-holder plate 2 and $k_i$ is a strictly positive constant, notably $k_i=0.71$.

In the design of the tool-holder plate 2, care is taken to ensure that the term $$\left| \frac{k_1}{(m-1)} * \Delta E_i \right| \leq \frac{IT}{2}$$

with IT being the tolerance interval given by the client.

FIG. 8 is a view in transverse cross section of the drilling device according to the plane PII-PII.

The drilling device 1 further comprises controlled individual displacement means 5a to 5c, controlled by control means 6 for axially displacing, in relation to the tool-holder plate 2, each of the rotary drilling spindles 3a1 to 3c3 according to their respective drilling directions parallel to M-M.

To automatically control the controlled individual displacement means 5a to 5c, the control means 6 comprise computation means 60 which are linked to acquisition means formed so as to be capable of memorizing a digital image of the form of the surface S of the sheet 12 to be drilled, and to position acquisition means capable of memorizing the position of the sheet 12 to be drilled in a predetermined reference frame R.

Figure 14:
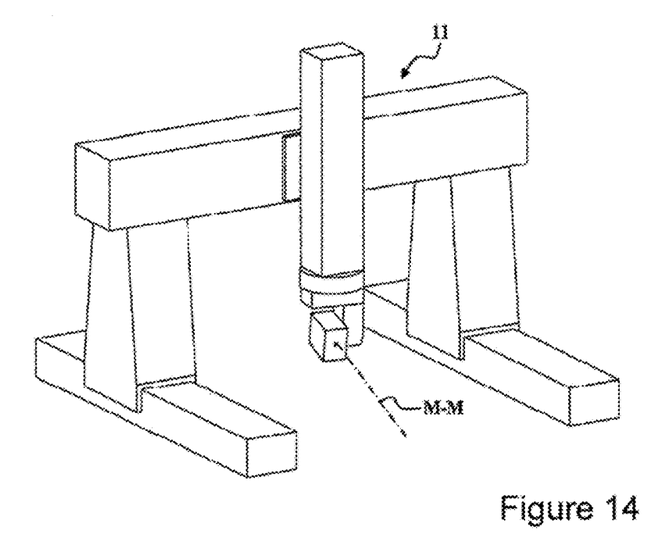
FIGS. 14 and 15 are perspective views of two automated digital carriers on which the drilling device according to the invention can be borne.
Figure 15:
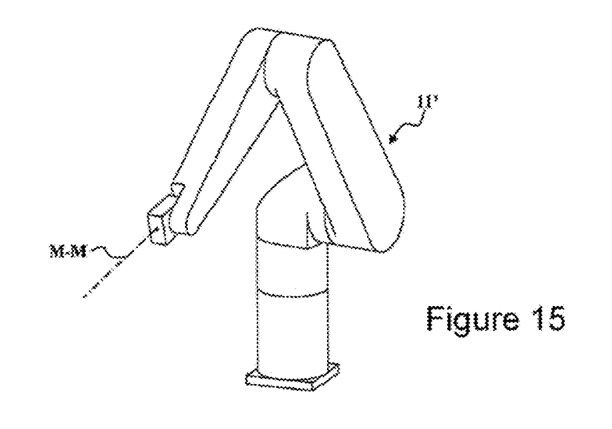

To ensure the displacement of the tool-holder plate 2 in relation to the sheet to be drilled during the drilling cycle, the tool-holder plate 2 is mounted on a cartesian carrier 11 with five or six axes (FIG. 14) or, as an alternative, on a polar carrier 11' with five or six axes (FIG. 15). The cartesian II and polar 11' carriers are both programmable numerically-controlled machines.

Figure 9:
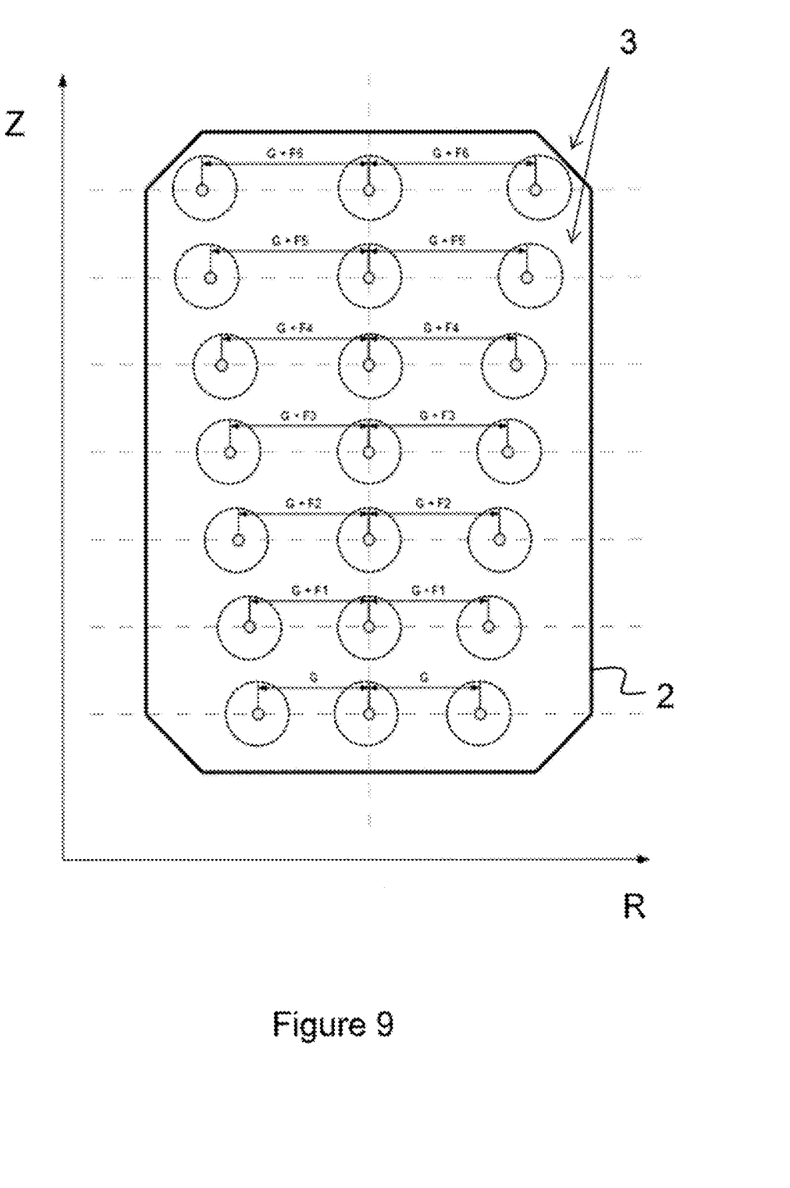
FIG. 9 shows an example according to a schematic front view of a tool-holder plate according to a second embodiment.

FIG. 9 shows a second embodiment whereby the number of rows of spindles 3 is greater than the number of columns of spindles 3. The drawing is again simplified and the spindles 3 are, as in the other figures, represented by a broken line circle. Indeed, the tool-holder plate 2 here has three columns and seven rows of spindles 3.

Figure 10:
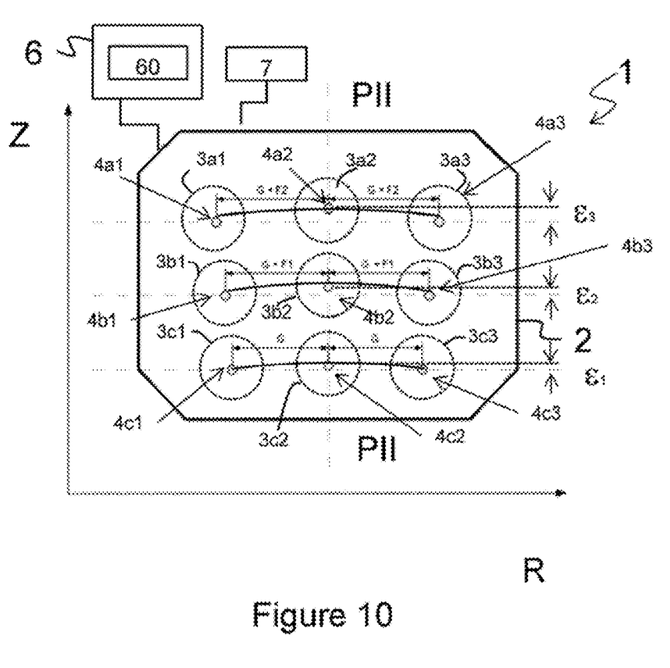
FIG. 10 shows a simplified diagram for positioning the central spindles offset in relation to the transverse direction.

FIG. 10 shows yet another embodiment which differs from that of FIG. 7 by the fact that the spindles 3a2, 3b2 and 3c2, called intermediate spindles, are no longer aligned with the spindles 3 of the adjacent columns, that is to say end spindles 3a1, 3b1 and 3c1 on the one hand and 3a3, 3b3 and 3c3 on the other hand, but offset according to the axial direction Z.

More specifically for a tool-holder plate 2 having a number m of columns of spindles 3 greater than or equal to three and in a same row of spindles formed by end spindles and intermediate spindles arranged between the end spindles, the intermediate spindles are offset according to the axial direction Z in relation to the end spindles.

The spindles 3 of a same row are arranged according to a circular arc which can be defined on the one hand by the two end spindles, here for example 3c1 and 3c3, 3b1 and 3b3 or even 3a1 and 3a3 and, on the other hand, by the vertex point of the circular arc which is situated equidistant from the end spindles and offset by a value $\varepsilon_i$ from the end spindles in the axial direction.

In the present exemplary embodiment, the vertex point of the circular arc coincides with the axis of the intermediate spindles, here 3a2, 3b2 and 3c2 respectively, and also with the position of the drill bits 4a2, 4b2 and 4c2.

The offset value $\varepsilon_i$ is given by the relationship:

$$\varepsilon_i = k_2 * (\Delta E_i - \Delta E_{i-1}),$$

in which $k_2$ is a constant, in particular $k_2=0.17$ and $\Delta E_0=0$.

In the case where the tool-holder plate 2 for example comprises four spindles 3, no spindle 3 of a same row is located at the vertex but there are two intermediate spindles 3 which are positioned on the duly defined circular arc and are offset by the same deviation from the line linking the two end spindles 3.

To produce holes in a sheet 12 having a conical portion using a drilling device 1 as defined above, the procedure is as follows.

In a first step, the form of the conical portion to be drilled is supplied to computation means 60.

To establish a drilling plan, the conical portion to be drilled is divided up into bands according to the axial direction Z.

Figure 11:
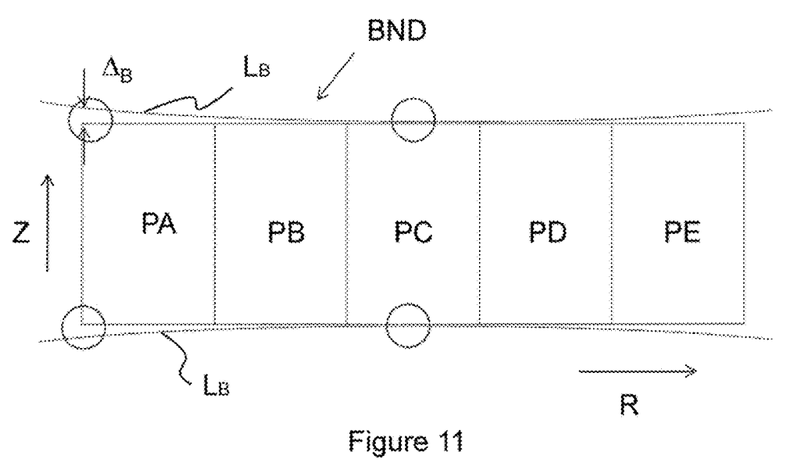
FIG. 11 shows an example of sheet portion to be drilled according to a first conventional version with a constant extension according to the axial direction of the patches.

FIG. 11 shows an example of such a band BND which has a form thinned at the center and wider at the ends. This issue arises in particular for sheets having variations in relation to a strict symmetry of revolution. In effect, the nacelles and thus the acoustic sheets 12 are close to a symmetry of revolution, but not exactly. More generally, airplane nacelle parts are of revolution with constant section or of revolution with non-constant section. Furthermore, within these parts, specific zones can be encountered which are of random form (notably the edges of the parts) and which are not of revolution but which belong to a global part having an axis of revolution.

FIG. 11 also shows various patches PA, PB, PC, PD and PE arranged contiguously.

Then, the tool-holder plate 2 is positioned to drill holes by successive patches in the band BND according to patterns by contiguous zones along the transverse direction R.

In FIG. 11, the holes are produced by orienting the tool-holder plate 2 in such a manner that the central plane P1 of the columns of spindles 3 is parallel to the axial direction Z of the sheet 12 to be drilled, the row of spindles $L_1$ having the smallest center-to-center distance between spindles 3 is arranged on the side of the smallest radius of the tapered part.

After having finished a band, the tool-holder plate 2 is displaced according to the axial direction Z to place it in position for the next band and to recommence the drilling operations.

Then, the method is stopped when the zones to be treated are provided with holes.

Figure 13:
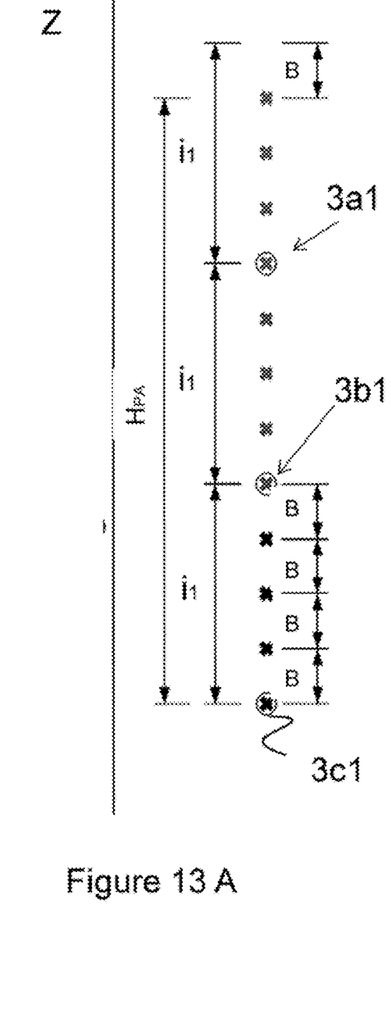
FIGS. 13A and 13B show, according to schematic views, simplified examples of drilling patterns according to the axial direction, namely a first conventional version and a second version making it possible to adapt the axial extension of the patches.

FIG. 11 and FIG. 13A show an example of sheet portion to be drilled according to a first conventional version with an axial extension of the patches that is constant.

As can be seen in FIG. 13A, the example relates to a tool-holder plate 2 with n rows of spindles 3, here n=3.

For simplification purposes, it can be considered that the tool-holder plate 2 is identical to that of FIG. 7 for example, but only the spindles 3a1, 3b1 and 3c1 are represented.

B is the nominal center-to-center distance between two holes shown by a cross and i1 is the nominal center-to-center distance between the spindles 3 which is a multiple of B ($i1=j*B$, with j a natural number>1, typically j lies between 4 and 10), in the present case $i1=4*B$. Conventionally, it is possible to choose the pitch of displacement of the tool-holder plate 2 in the axial direction Z to be equal to the nominal center-to-center distance B between two holes. In this case, the axial extension of the patches PA to PE is constant and equal to the number of spindles 3 in a column minus a pitch, that is to say, in the present case with m spindles 3 per row:

$$H_{PA}=m*i1-B=(m*j-1)*B.$$

Figure 12:
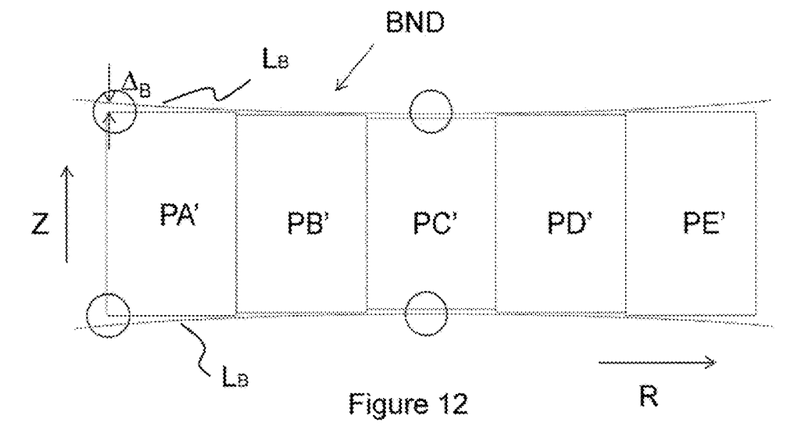
FIG. 12 shows an example of sheet portion to be drilled according to a second version making it possible to adapt the extension according to the axial direction of the patches.

As can be seen in FIG. 11 in the band, the central patch PC is well placed while PA and PE show a not-inconsiderable deviation $\Delta_B$ with the band limit $L_B$, which leads to "inter-band" defects which can appear on sheets 12 which follow a symmetry of quasi-revolution. To remedy these inter-band defects, the applicant had the idea that the extension in the axial direction of the patches can be modified within certain limits as shown in FIGS. 12 and 14B.

FIG. 14B is similar to that of FIG. 14A and differs only by the drilling pitches in the axial direction.

Thus, when producing holes for a given patch, it is possible to choose a regular pitch of displacement different from the center-to-center distance between holes, that is to say a pitch $B_1 \neq B$ (see FIG. 138B).

In this case:

$$H'_{PA}=m*i1-B_2 \text{ with } B_2=i1-j*B_1$$

The only additional condition for $B_2$ is that $B_2$ must be within the limit of the center-to-center distance tolerances between holes.

In FIG. 13B for example, by choosing $B_1>B$, the center-to-center distance between the last hole produced by the first spindle $3c1$ and the first hole produced by the spindle $3b1$ is equal to $B_2<B$. However, it will be noted that the axial extension of the patch of FIG. 13B is greater than that of FIG. 13A.

Thus, it will be understood that it is possible to adjust the axial extension of the patches and reduce, even eliminate, the inter-band defects.

The concept behind this adaptation of the axial extension is similar to that for the design of the tool-holder plate 2 to reduce or even eliminate the defects linked to the conical form of the sheet 12, that is to say to spread or distribute, for each column, the defect according to the axial direction while remaining within the center-to-center distance tolerances given by the manufacturer of the sheet 12 to be drilled.

According to an embodiment, the method making it possible to adapt the axial extension of the patches can be implemented independently also for a tool-holder plate 2 with matrix-wise distribution of spindles 3. A patent protection could be sought independently for this method.

FIG. 12 is similar to FIG. 11 except that the axial extension according to Z of the various patches PA', PB', PC', PD' and PE' arranged contiguously is no longer constant and is adapted to the band limits $L_B$ to reduce $\Delta_B$ as much as possible while remaining within the limits $L_B$.

As can be seen in FIG. 12, the inter-band limits $L_B$ can be better observed for the set of patches PA' to PE'.

It will be understood that, through the features of the invention, it is possible to better observe the specifications for the sheets 12 having portions that are in particular conical. This then makes it possible to contribute to a better efficiency of the acoustic sheet surrounding the turbojet engine and to further reduce the noise emitted thereby.

There is also a gain in efficiency because it is possible to increase the number of spindles 3 for a tool-holder plate 2 and reduce the time needed for drilling.

The invention claimed is:

1. A drilling device for drilling a sheet having conical portions, comprising:
a tool-holder plate provided with a plurality of rotary drilling spindles with drill bits oriented according to drilling directions parallel to a mean drilling direction, said drilling spindles being distributed in columns configured to be arranged according to an axial direction and in rows configured to be arranged according to a transverse direction at right angles to the axial direction; and
at least two rows of spindles and at least two columns of spindles,
wherein a center-to-center distance between two spindles of a row is different from a center-to-center distance between two spindles of another row, and
wherein G is a nominal center-to-center distance between two spindles of a same row in a matrix configuration of the tool-holder plate and $\Delta E_i$ is a maximum inter-patch deviation determined for a row $L_i$ which would result from drillings over a conical portion by a matrix configuration of the tool-holder plate, i is an integer number such that i=1 to n, where n is a number of rows of spindles of the tool-holder plate. and a distance between two spindles of a same row i is given by the relationship:

$$D = G + F_i = G + \frac{k_1}{(m-1)} * \Delta E_i,$$

where m corresponds to a number of columns of spindles of the tool-holder plate and $k_1$ is a constant.

2. The drilling device according to claim 1, wherein the tool-holder plate has first and last rows of spindles, the first row of spindles configured to be arranged on a side of a tapered part having a smallest radius of the sheet to be drilled and the last row of spindles configured to be arranged on a side of the tapered part having a greatest radius of the sheet to be drilled, the center-to-center distance between two spindles increasing from one row to another row between the first and the last rows of spindles.

3. The drilling device according to claim 1, wherein the constant $k_1$=0.71.

4. The drilling device according to claim 1, wherein a number of rows of spindles is greater than a number of columns of spindles.

5. The drilling device according to claim 1, wherein a number m of columns of spindles is greater than or equal to three, and in a same row of spindles, intermediate spindles arranged between end spindles are offset according to the axial direction in relation to the end spindles.

6. The drilling device according to claim 5, wherein spindles of a same row are arranged according to a circular arc.

7. The drilling device according to claim 6, wherein the circular arc is defined by two end spindles and a vertex point situated equidistant from the two end spindles, the vertex point being offset by a value c, from the two end spindles in the axial direction, the value c, is given by the relationship:

$$\varepsilon_i=k_2*(\Delta E_i-\Delta E_{i-1}),$$

where $k_2$ is a constant and $\Delta E_0$=0.

8. The drilling device according to claim 7, wherein the constant $k_2=0.17$.

9. A method for drilling a sheet having a conical portion using a drilling device according to claim 1, wherein:
- a form of the conical portion to be drilled is supplied to computation means,
- the conical portion to be drilled is divided up into bands according to a transverse direction, and then, for at least one band:
- the tool-holder plate is positioned to drill holes by contiguous zones along the transverse direction by orienting the tool-holder plate in such a way that a row of spindles having a smallest center-to-center distance between spindles is arranged on a side of the sheet to be drilled having a smallest radius.

10. The method according to claim 9, wherein, when drilling holes according to a pattern in a zone, the tool-holder plate is directed between two hole drilling operations according to regular pitches in the axial direction and/or the transverse direction corresponding to the center-to-center distance between holes according to the axial direction and/or the transverse direction.

11. The method according to claim 9, wherein, when drilling holes according to a pattern in a zone, the tool-holder plate is directed between two hole drilling operations according to regular pitches whose spacing in the axial direction lies within a nominal center-to-center distance tolerances between holes and different from a nominal center-to-center distance between holes in the axial direction so as to configure an extension in the axial direction of the zone to be drilled to correct geometrical defects between bands to be drilled.

12. A drilling device for drilling a sheet having conical portions, comprising a tool-holder plate provided with a plurality of rotary drilling spindles with drill bits oriented according to drilling directions parallel to a mean drilling direction, said drilling spindles being distributed in columns configured to be arranged according to an axial direction and in rows configured to be arranged according to a transverse direction at right angles to the axial direction, the device comprising at least two rows of spindles and at least two columns of spindles, wherein a center-to-center distance between two spindles of a row is different from a center-to-center distance between two spindles of another row, and wherein G is a nominal center-to-center distance between two spindles of a same row in a matrix configuration of the tool-holder plate and $\Delta E_i$ is a maximum inter-patch deviation determined for a row $L_i$ which would result from drillings over a conical portion by a matrix configuration of the tool-holder plate, i is an integer number such that i=1 to n, where n is a number of rows of spindles of the tool-holder plate, and a distance between two spindles of a same row i is given by the relationship:

$$D = G + F_i = G + \frac{k_1}{(m-1)} * \Delta E_i,$$

where m corresponds to a number of columns of spindles of the tool-holder plate and $k_1$ is a constant.

* * * * *